(12) United States Patent
Verma et al.

(10) Patent No.: US 8,010,497 B2
(45) Date of Patent: Aug. 30, 2011

(54) DATABASE MANAGEMENT SYSTEM WITH EFFICIENT VERSION CONTROL

(75) Inventors: Sanjay Verma, Foster City, CA (US); Mark L. McAuliffe, Palo Alto, CA (US); Sherry Listgarten, Palo Alto, CA (US); Sibsankar Haldar, Madhyamgram (IN); Chi-Kim Hoang, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 977 days.

(21) Appl. No.: 11/757,224

(22) Filed: Jun. 1, 2007

(65) Prior Publication Data

US 2007/0233683 A1    Oct. 4, 2007

Related U.S. Application Data

(62) Division of application No. 10/636,361, filed on Aug. 6, 2003, now Pat. No. 7,243,088.

(51) Int. Cl.
    *G06F 7/00* (2006.01)
(52) U.S. Cl. .................. 707/662; 707/661; 707/667
(58) Field of Classification Search .......... 1/1; 707/661, 707/662, 667
    See application file for complete search history.

(56) References Cited

U.S. PATENT DOCUMENTS

| | | | |
|---|---|---|---|
| 4,627,019 A | 12/1986 | Ng | |
| 4,875,159 A | 10/1989 | Cary et al. | |
| 5,170,480 A | 12/1992 | Mohan et al. | |
| 5,280,612 A | 1/1994 | Lorie et al. | |
| 5,287,496 A | 2/1994 | Chen et al. | |
| 5,313,629 A | 5/1994 | Abraham et al. | |
| 5,390,316 A | 2/1995 | Cramer et al. | |
| 5,410,697 A | 4/1995 | Baird et al. | |
| 5,423,037 A | 6/1995 | Hvasshovd | |
| 5,440,727 A | 8/1995 | Bhide et al. | |
| 5,452,445 A | 9/1995 | Hallmark et al. | |
| 5,485,607 A | 1/1996 | Lomet et al. | |
| 5,497,483 A | 3/1996 | Beardsley et al. | |
| 5,555,404 A | 9/1996 | Torbjornsen et al. | |
| 5,577,240 A | 11/1996 | Demers et al. | |
| 5,586,310 A | 12/1996 | Sharman | |

(Continued)

FOREIGN PATENT DOCUMENTS

WO    WO 01/77908    10/2001

OTHER PUBLICATIONS

Bober, P., Carey, M., "Indexing for multiversion locking: alternatives an performance evaluation", IEEE Transactions on Knowledge and Data Engineering, vol. 9, No. 1, Jan.-Feb. 1997.

(Continued)

*Primary Examiner* — Paul Kim
(74) *Attorney, Agent, or Firm* — Hickman Palermo Truong & Becker LLP

(57) ABSTRACT

A two copy versioning scheme is proposed. The scheme provides efficient implementation for a high read load database and eliminates read dependencies. The versioning scheme provides efficient implementation for transactions executing under ANSI READ COMMITTED isolation, and is extensible to serializable isolation. The two-copy versioning scheme is garbage free meaning that all versions of data records are used during execution and is adapted to index scanning operations. A "deferred delete" scheme allows read transactions to complete data deallocation operations. Statements that require "snapshots" are efficiently supported.

26 Claims, 7 Drawing Sheets

U.S. PATENT DOCUMENTS

| | | | |
|---|---|---|---|
| 5,621,795 | A | 4/1997 | Baker et al. |
| 5,701,480 | A | 12/1997 | Raz |
| 5,708,812 | A | 1/1998 | Van Dyke et al. |
| 5,737,601 | A | 4/1998 | Jain et al. |
| 5,758,337 | A | 5/1998 | Hammond |
| 5,781,910 | A | 7/1998 | Gostanian et al. |
| 5,796,999 | A | 8/1998 | Azagury et al. |
| 5,806,075 | A | 9/1998 | Jain et al. |
| 5,809,503 | A | 9/1998 | Aoshima |
| 5,852,715 | A | 12/1998 | Raz et al. |
| 5,870,758 | A | 2/1999 | Bamford et al. |
| 5,923,833 | A | 7/1999 | Freund et al. |
| 5,974,427 | A | 10/1999 | Reiter |
| 6,009,425 | A | 12/1999 | Mohan |
| 6,122,645 | A | 9/2000 | Bohannon et al. |
| 6,233,585 | B1 | 5/2001 | Gupta et al. |
| 6,295,610 | B1 | 9/2001 | Ganesh et al. |
| 6,351,753 | B1 | 2/2002 | Jagadish et al. |
| 6,502,133 | B1 | 12/2002 | Baulier et al. |
| 6,631,478 | B1 | 10/2003 | Wang et al. |
| 6,647,510 | B1 | 11/2003 | Ganesh et al. |
| 2003/0078910 | A1* | 4/2003 | Kanai et al. ............ 707/1 |
| 2003/0200212 | A1 | 10/2003 | Benson et al. |
| 2004/0015642 | A1* | 1/2004 | Moir et al. ............ 711/1 |
| 2004/0139116 | A1 | 7/2004 | Porter |
| 2004/0205066 | A1 | 10/2004 | Bhattacharjee et al. |
| 2004/0220933 | A1 | 11/2004 | Walker |
| 2004/0267747 | A1 | 12/2004 | Choi et al. |

OTHER PUBLICATIONS

Chan, A. et al, "The Implementation of an Integrated Concurrency Control and Recovery Scheme", Proceedings of the Association for Computing Machinery SIGMOD International Conference on Management of Date, Orlando, Florida, Jun. 1982.

Lomet, D., MLR: A Recovery Method for Multi-level systems, ACM SIGMOS 1992.

Kempster, T. et al., Diluting ACID, SIGMOD Record, vol. 28, No. 4, Dec. 1999.

Lamport, L., On lnterprocess Communication. Part I: Basic Formalism and Part II: Algorithms, Distributed Computing 1 (2): 77-101, 1986.

Lomet, D., et al. "Access methods for multiversion data", D. Lomet, B. Salzberg, SIGMOD Conference 1989; 315-324.

Mohan, C., "Commit_LSN: A novel and simple method for reducing locking and latching in transaction processing systems", 16th VLDB Conference (Brisbane, Australia), Aug. 1990.

Mohan,C., Pirahesh, H., Lorie, R., "Efficient Flexible Methods for Transient Versioning of records to avoid locking by read-only transactions", ACM SIGMOD 1992.

Oracle 9i Database concepts, Chapter 22, Date Concurrency and Consistency, on-line documentation at http://doc. oracle.com, Jul. 2001.

Bober, P., Carey, M., "Multiversion Query Locking", P. Bober, M. Carey, Proceedings of the 18th VLDB Conference (Vancouver, British Columbia, Canada) 1992.

Reed, D., PhD Thesis, "Naming and Synchronization in a Decentralized Computer System", Technical Report MIT/LCS TR-205, Massachusetts Institute of Technology, pp. 1-181, Sep. 1978.

Robinson, J. et al., "Elimination of Lock Contention and Relational Databases Accessed by Read-Only Queries and On-Line Update Transactions", IBM Technical Disclosure Bulletin, pp. 180-185, Jun. 1988.

Stearns, Richard E. et al., "Distributed Database Concurrency Controls Using Before-Values", Proceedings of the Association for Computing Machinery SIGMOD International Conference on management of Data, Ann Arbor, Michigan, pp. 74-83, Apr. 1981.

"Times-Ten Team: In-Memory Data Management for Consumer Transactions the Times Then Approach", SIGMOD conference, Philadelphia, PA, pp. 528-529, 1999.

Weikum, G., A theoretical foundation of multi-level concurrency control, Proc. of ACM PODS Conf., Mar. 1986.

Weikum G., Principles and realizations strategies of multilevel transaction management, ACM Transactions and Database Systems, vol. 16, No. 1, pp. 132-180, Mar. 1991.

Communication regarding examination of European Patent Application No. 04 780 485.1-1243 dated Feb. 15, 2007.

Bernstein, P.A., et al., "Concurrency Control and Recovery in Database Systems; Multiversion Concurrency Control," Concurrency Control and Recovery in Database Systems, Addison-Wesley, pp. 143-166, 1987.

Anonymous, "Bonus C for Dummies Lesson 17-6—Sorting a Structure," Internet Article, Online! 2002, pp. 1-3. www.c-for-dummies.com/lessons/chapter.17/06. Retrieved on Dec. 21, 2004.

Mohan, C., et al., "Efficient and Flexible Methods for Transient Versioning of Records to Avoid Locking by Read-Only Transaction," Proceedings of the ACM SIGMOD International Conference on Management of Data, pp. 124-133, San Diego, Jun. 2-5, 1992.

Greenwald et al., "Oracle Essentials: Oracle 8 & Oracle 8i—Chapter 7, Multiuser Concurrency," Internet article, Online! Oct. 1999, pp. 1-7. www.cs.wisc.edu/{cs764-1/oracle.locking.html. Retrieved on Dec. 23, 2004.

Molesky et al, "Recovery Protocols for Shared memory Database Systems"; Association of Computing Machinery; 1995; pp. 11-22.

Agrawal, D, Krishnaswamy, V. "Using multiversioning data for non-interfering execution of write-only transactions", SIGMOD Conference 91, 98-107.

Ahuja, M., Browne, J., "Performance Evaluation of Two Concurrency control Protocols for distributed data bases with multi-versioned entities". IEEE 1988, 426-436.

Bayer, R., Heller H., Reiser, A.,"Parallelism and Recovery in Database", Transactions on Database Systems, vol. 5, No. 2, pp. 139-156, Jun. 1980.

Bernstein, P. and Goodman, N. "Multiversion Concurrency Control—Theory and Algorithms", ACM Transactions and Database Systems, vol. 8, No. 4, pp. 465-483, Dec. 1983.

Berenson, et al.,A critique of ANSI SQL Isolation Levels, SIGMOD, San Jose, California 1995.

Bober, P, Carey, M. "On Mixing Queries and Transactions via Multiversion Locking", ICDE Madison, Wisconsin, 1992: 535-545.

Mohan, C., "ARIES/KVL: A Key-Value Locking Method for Concurrency Control of Multiaction Transactions Operating on B-Tree Indexes," Proceedings of 16th VLDB Conference, Brisbane, Australia, Aug. 1990, pp. 392-405.

Mohan, C.et al., "ARIES/IM: An Efficient and High Concurrency Index Management Method Using Write-Ahead Logging," 1992 ACM SIGMOD, California, Jun. 1992, pp. 371-380.

* cited by examiner (NEW TUPLE INSERTION)

DATABASE MANAGEMENT SYSTEM WITH EFFICIENT VERSION CONTROL

CROSS-REFERENCES TO RELATED APPLICATIONS

The present application is a divisional of U.S. patent application Ser. No. 110/636,361, filed Aug. 6, 2003, which is hereby incorporated by reference in its entirety.

TECHNICAL FIELD

This invention relates to the management of data that can be accessed concurrently by multiple users.

BACKGROUND

A database is a collection of related records stored in a computer. In the art, this collection of data records is also referred to as an information database. Data records are alternatively referred to as data tuples, or simply tuples. Multiple users may concurrently access these data records. Transactions are run on behalf of database users to access these data records. A transaction may read from the database, write into the database, or do both. Thus, transaction execution yields a set of read and write operations on a set of data records. Transactions typically request access permissions for the data records they read or write. Access permissions are usually implemented via locks. A transaction typically requests access permission on a data record by asking for a corresponding lock. Conflicts in access permissions manifest themselves as lock conflicts. Lock conflicts may arise when multiple transactions try to access the same data record at the same time in incompatible modes.

One of the ways to resolve lock conflicts is to make conflicting transactions wait. For example, the transaction that issued a conflicting lock request on a data record is forced to wait until the transaction that already owns a lock on the same record completes its execution (By completion of a transaction we mean that the transaction either commits or rollbacks). However, in such a scenario, two or more transactions may end up in a deadlock where each transaction waits for the other transaction to complete, thereby preventing either one from making any progress.

Many techniques have been invented for reducing the amount of locks used in transactional systems, such as timestamp ordering, validation, and multi-version schemes. Out of these schemes, multi-version schemes have become commercially successful, and many vendors use these schemes. In a typical multi-version scheme, write operations on a data record create new versions of the record, and read operations select an appropriate version of the record from the available versions for reading. In this type of database systems, multiple versions of a data record may exist simultaneously. Some of these versions may not be used by any currently executing or future transactions. These unused versions are referred to as "garbage". Hence, these systems need to employ garbage collection mechanisms to reclaim space occupied by the unused versions. Many multi-version database schemes have lazy garbage collection where old versions of data records exist in the database longer than is necessary, and are unbounded in terms of how long garbage may exist in that database.

Concurrent execution of multiple transactions requires that there be some protection of a given transaction from other transactions. This protection that a transaction has from other transactions is called its "isolation". For example, if a transaction executes a write operation on a data record, then the new data value should not be read by any other transaction until the former transaction is complete. ANSI has defined various isolation levels. An example is the commonly known "Serializable" isolation level where multiple transactions execute in such a way that the execution schedule is equivalent to a serial schedule where all operations of each transaction are clustered, i.e., transactions appear to have been executed one after another serially. Serializability is the highest degree of isolation.

Independent of the isolation achieved via any locking mechanism, some database operation need that the data records as read by the operation be stable, i.e., the data records the operation visited once never change until the end of the operation execution. This requirement is commonly known as "snapshot" of data. The common language used to execute database operations is the Structured Query Language (SQL). Some SQL statements may need to refer to a tuple, or a set of tuples, satisfying a predicate more than once during their execution. If a Database Management System (DBMS) guarantees that a SQL statement execution will see the same data values each time a given predicate is evaluated, then the DBMS is said to provide "snapshot" isolation.

Prior art describes database systems using two-version techniques, as well as multi-version techniques, that satisfy the above requirements for transactions executing under serializable isolation. However, these schemes have several drawbacks. For example, a read-only transaction must declare itself as such. This is not practical since many DBMSs create SQL statements on the fly and it may not be possible to assess at the start of each and every transaction whether the transaction is read-only or not. Secondly, current analysis and commercial success of a few products demonstrate that though serializable isolation is a theoretically interesting concept, the most practical isolation is the ANSI SQL isolation READ COMMITTED, or variations thereof.

There is currently a need to improve tradeoffs between transaction concurrency and the problems that arise from presently used access control and lock conflict resolution in systems that allow concurrent processing, focusing on efficient implementation for ANSI READ COMMITTED transaction.

SUMMARY OF INVENTION

Each data record is internally represented by a single logical tuple. A logical tuple points either directly to a single physical tuple or to a data structure called "version-list". The physical tuples are also called "content items". A logical tuple may have association with two physical content items through the version-list. The most recently committed value in a data record represented by one of these two physical content items is referred to as the "committed content item". Each physical content item stores a data value and a set of control flags: (1) a delete bit; (2) an allocation bit; (3) a reference count.

Access control on data records may be maintained by a locking component in the DBMS. When a transaction wants to update a data record, it acquires an exclusive permission on the data record by placing an X-lock on the logical tuple. Then, the transaction creates a new version of the committed physical content item of the data record. This new physical version is referred to as an "uncommitted content item".

In a quiescent state all logical tuples point to their respective committed physical content items. A write operation on a data record creates a version-list and makes the corresponding logical tuple point to the version-list. The version-list maintains at most two physical content items for a given logical tuple. The version-list has two fields for this purpose: (1) the committed physical content item also called the "read copy", and (2) the uncommitted physical content item also known as the "write copy". The committed physical content item is the current read copy that may be referenced by any transaction. The (pending) uncommitted content item field in the version-list references physical uncommitted copy used solely by the transaction that executed the given write operation. When this "write" transaction commits, if possible, the previous read copy (old committed content item) is deallocated. After the write transaction commits, the logical tuple points to the new committed content item, the version-list is deallocated, and the X-lock on the logical tuple is released.

A read operation does not hold exclusive access rights on a logical tuple or its physical content item. The read operation simply increases reference count of the latest committed physical content item. When the read operation is complete, it decrements the reference count associated with the physical content item. As already described, at commit time, each write transaction switches the write copy (uncommitted content item) into the read copy (committed content item). Then the write transaction checks the reference count of the old committed content item (i.e. the previous read copy). If the reference count is zero, the old committed physical content item is immediately deallocated along with all log records that describe the deleted content item. If the reference count for the committed physical content item is positive, the write transaction does not deallocate the physical content item. The write transaction then performs a fake delete alternatively referred to as a "deferred delete".

A write transaction performs a deferred delete on a data record by setting the deleted bit of the corresponding old committed content item. It then pushes all log records as if the delete was actually performed. However, the allocation bit of the physical content item is kept in a state that prevents the old committed content item from being recycled by the DBMS. When the write transaction commits, irrespective of whether the read copy (old committed physical content item) is released or not, the version-list is deallocated and the logical tuple points directly to the new committed content item.

As explained earlier a read operation decrements the reference count of all physical content items it read when the operation execution is complete. If a deferred delete was performed by a write transaction on a physical content item, then the reference count of the then committed physical content item must have been positive. Eventually all read operations finish their executions, and the reference count for that physical content item falls to zero. The read operation that reduced the reference count to zero checks to see if this content item was previously marked for deletion by a write transaction. In this case (deferred delete), the read operation resets the allocation bit for that physical content item making it available to the DBMS for recycling. Note that a read operation deallocates a physical content item by turning off the allocation bit without having to write any log records.

The versioning control system is garbage free even in the presence of the deferred deletes. If no read operation is presently accessing the read copy of a data record, the read copy is discarded as soon as a new write transaction is complete. Otherwise, the last read operation cleans up the physical content item. Thus, physical content items are not allocated for any length of time that is more than absolutely necessary.

For sorting and other similar transactions, which need the SQL snapshot isolation, deferred deletes allow read operations to revisit data records in their temporary space simply by copying logical tuple pointers. This allows the sort transaction to manage the reference count and the lifetime of the physical content item being read.

Generally versioning techniques lead to inefficient index maintenance. However, by using aspects of our version control scheme we have achieved fast index maintenance. Each entry in every index has a committed/uncommitted bit. We will explain how this bit is set for three categories of write operations—insert, delete and update. For an insert of logical tuple, an uncommitted content item in inserted into the indexes and the corresponding index entry is marked committed. For a delete of a logical tuple, no action is taken till commit time. At commit of the transaction, index entries are deleted and corresponding bits have no meaning. For an update of a logical tuple, as explained earlier, a new physical tuple—the uncommitted content item—is inserted into the indexes and the corresponding bits are marked "uncommitted". When this transaction commits, the index entries are updated to mark the same entries "committed". On the other hand, if this transaction rollbacks then we simply remove the index entry. An index scan then receives a null value when referencing the wrong index entry.

DETAILED DESCRIPTION

Figure 1:
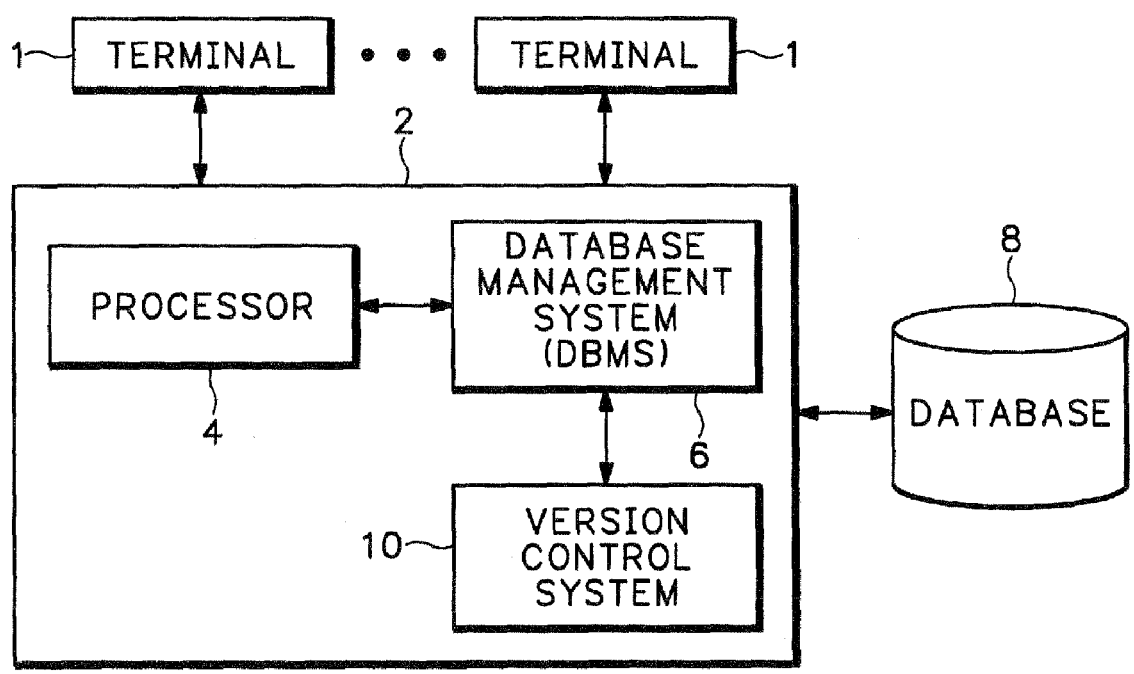
FIG. 1 is a block diagram of a database system that uses a version control system.

FIG. 1 shows a database system that includes a database 8 and a processor 4 (Central Processing Unit (CPU) and memory) that stores and executes software for a Database Management System (DBMS) 6 and a version control system 10. A computing device 2 containing processor 4 in one example is a server. Such systems are also referred to as database servers. The processor 4 may be a single CPU or multiple CPUs that operate in the server 2. The database 8 is typically stored on a plurality of Direct Access Storage Devices (DASDs) although only one such device is illustrated in FIG. 1. The DASDs may be, for example, disk packs, and it is understood by those skilled in the art that the database system includes the required DASD controllers and channels that establish the communication between the database 8 and the processor 4. In another example, the database (8) may be stored inside the main memory (4) itself.

Terminals 1 are any Input/Output (I/O) device that accepts requests from and returns results to database users. For example, the terminals may be Personal Computers (PCs) or applications that use the advertised application programmer interface (API). Transactions and queries are submitted from the terminals 1 and are processed concurrently by the DBMS 6. Different versions of data in the database 8 are maintained by the version control system 10.

Figure 2:
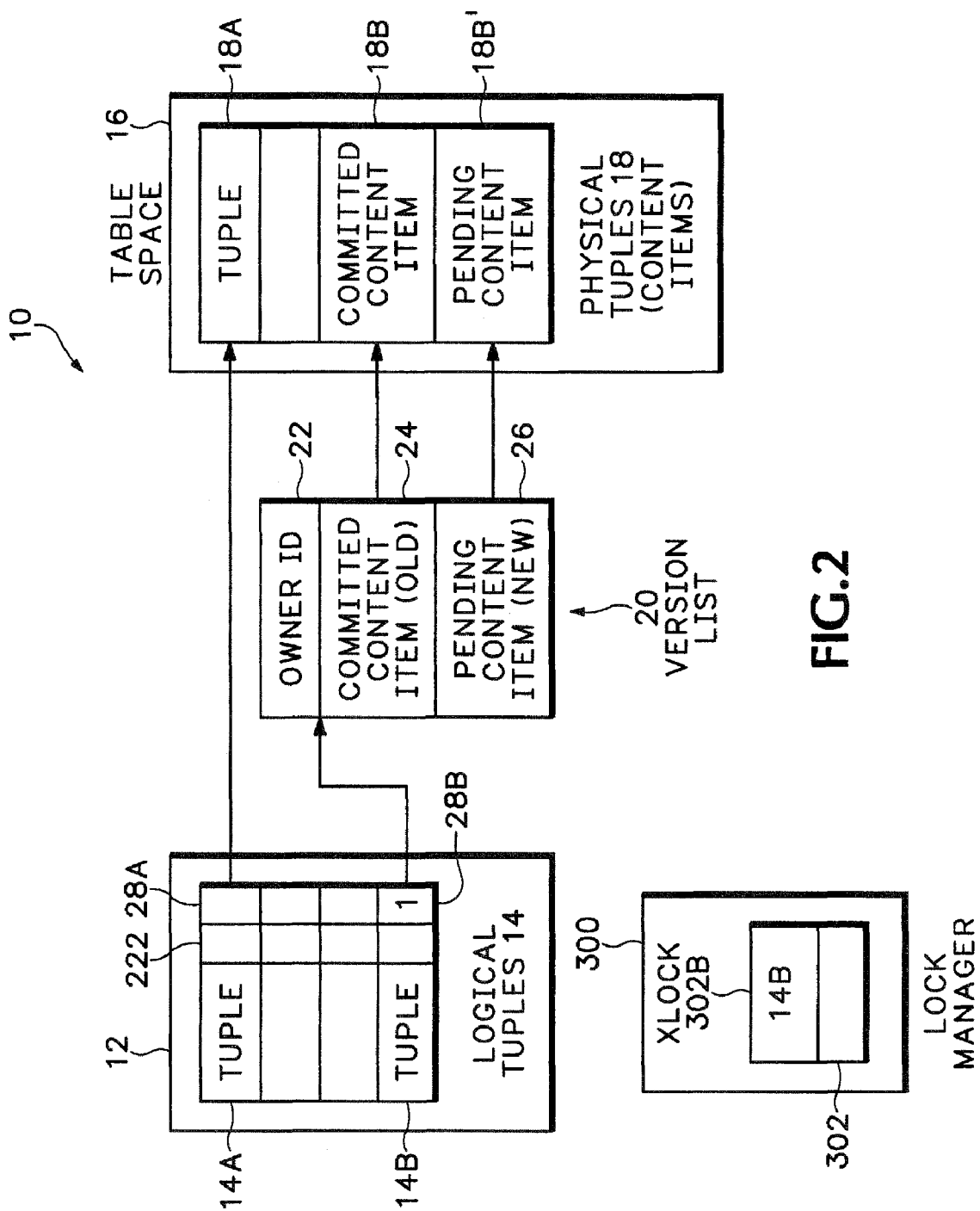
FIG. 2 is a block diagram showing how a version control system operates in the database system.

FIG. 2 describes the version control system 10 in more detail. The logical table 12 contains a set of logical tuples 14. Each logical tuple 14 points either directly to a physical content item 18 in the physical table 16 or points to a version-list 20. For example, logical tuple 14A contains a pointer that points directly to physical content item 18A, and logical tuple 14B contains a pointer that points to version-list 20. Logical tuple 14 contains a flag field 222 that indicates whether the logical tuple points to a version-list or directly to a physical tuple.

Exclusive locks (X-locks) 302 are associated with the logical tuples 14 and indicate that a write operation from one transaction has locked out write operations from other transactions from accessing that same logical tuple. These locks are managed by the DBMS. For example, X-lock 302B in the Lock Manager 300 from one transaction prevents write operations under other transactions from accessing logical tuple 14B. Any operation, that can access a logical tuple 14, first checks whether an associated version-list exists by checking the version-list flag 222 in the logical tuple 14. The operation that accesses a logical tuple with the version-list flag 222 set goes to the associated version-list.

The physical table space 16 contains physical tuples alternatively referred to as content items. When a write operation is complete on a data record, but before its owner transaction commits, the data record (the logical tuple) has two physical versions in the physical table space. A committed content item is available only to read operations, and a pending content item is available only to the write transaction that created it. For example, logical tuple 14B was modified by a write operation. The writer created a copy 18B' from the original committed content item 18B for the logical tuple 14B. The committed content item 18B is available to any read operation. However, the pending content item 18B' is available only to the write transaction that created the pending content item 18B'.

The tuple version-list 20 consists of three fields. (1) An "owner Id" field contains the unique identifier of the transaction that created the version-list 20. For example, the transaction Id (XID) for the write transaction that created pending content item 18B' is located in owner Id field 22. (2) A "committed content item" field 24 contains a pointer to the physical committed content item 18B in the physical table space 16. (3) A "pending content item" field 26 points to the pending content item 18D' in the physical table space 16.

Figure 3:
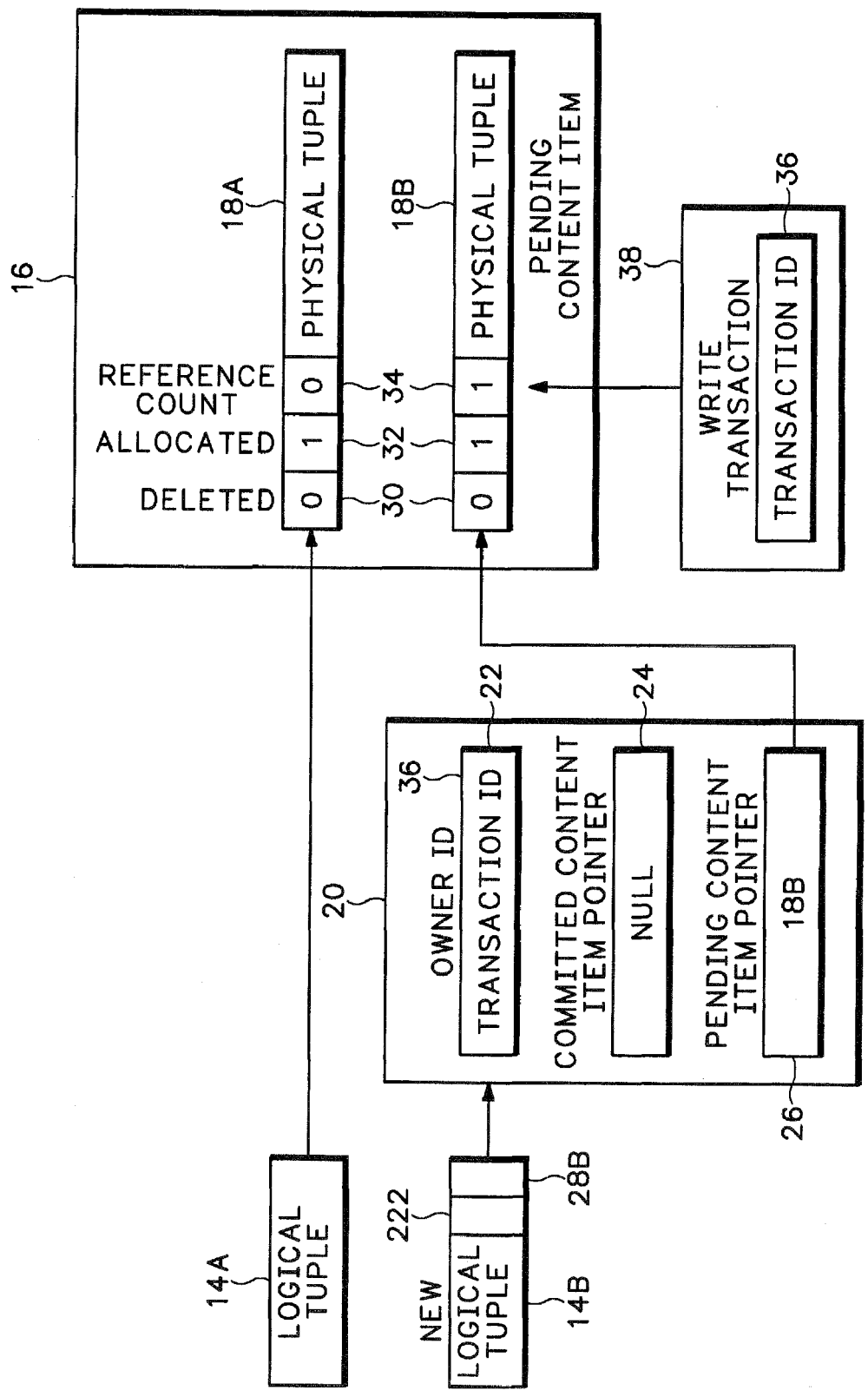
FIGS. 3 and 4 are block diagrams showing in further detail the operation of the version control system.

FIG. 3 shows the database when there is no active transaction associated with a particular physical content item 18A. In this condition, the logical tuple 14A points directly to the committed content item 18A and there is no tuple version-list 20. For example, the address value in logical tuple 14A points directly to the address location where the physical tuple 18A is located in the physical table space 16.

The physical content items 18 have an associated deleted flag 30, an allocated flag 32 and a reference count 34. The deleted flag 30 is used to mark physical content items for deletion. The allocated flag 32 is used to identify that the space is currently allocated. The reference count 34 identifies the number of read operations currently referencing the physical content item.

Any one of an insert, delete or update is referred to generally as a write operation 38. All operations, including read operations, occur under transactions with associated XIDs. When a write operation 38 creates a logical tuple, it goes through the following steps. Insert operation 38 creates a new physical content item 18B in the physical table space 16, and also creates the associated version-list 20. Then it creates a new logical tuple 14B which points to the version-list 20. The owner Id field 22 in the version-list 20 contains the transaction Id (XID) 36 for the write operation 38. The committed content item field 24 is set to NULL and the pending content item field 26 points to the newly inserted physical content item 18B. This completes the insertion of a new logical tuple into the table space.

A table-scan by some transaction, other than the above mentioned write transaction 38, will see only the committed content item field 24 in the version-list 20. Finding field 24 to be NULL, this transaction will skip the logical tuple 14B. Because the transaction Id 36, for the write transaction 38, matches the value in the Owner Id field 22, a scan by the write transaction 38 will look at the pending content item field 26. Once the write transaction 38 commits, the version-list 20 is destroyed, the indicator 222 in the logical tuple is set to 0 and the logical tuple 14B points directly to the physical tuple 18B. At this point the deleted flag 30 for content item 18B is not set. The allocated flag 32 is the same value as when the physical content item 18B was created indicating to the DBMS 6 (FIG. 1) that the physical address space in the table space 16 is currently allocated to content item 18B, and the reference count 34 is set to zero.

Deferred Deletes

The delete operation is very similarly to the insert operation described above. The only difference for a delete operation from an insert operation is that the committed content item 24 in version-list 20, for a delete of a logical tuple 14B, will point to the committed content item 18B and the pending content item 26 is NULL. Using the same logic as described for the insert operation, other transactions will see the previous value of the logical tuple 14B (i.e. committed content items 18B). The current transaction 38 will skip this logical tuple 14B.

Figure 4:
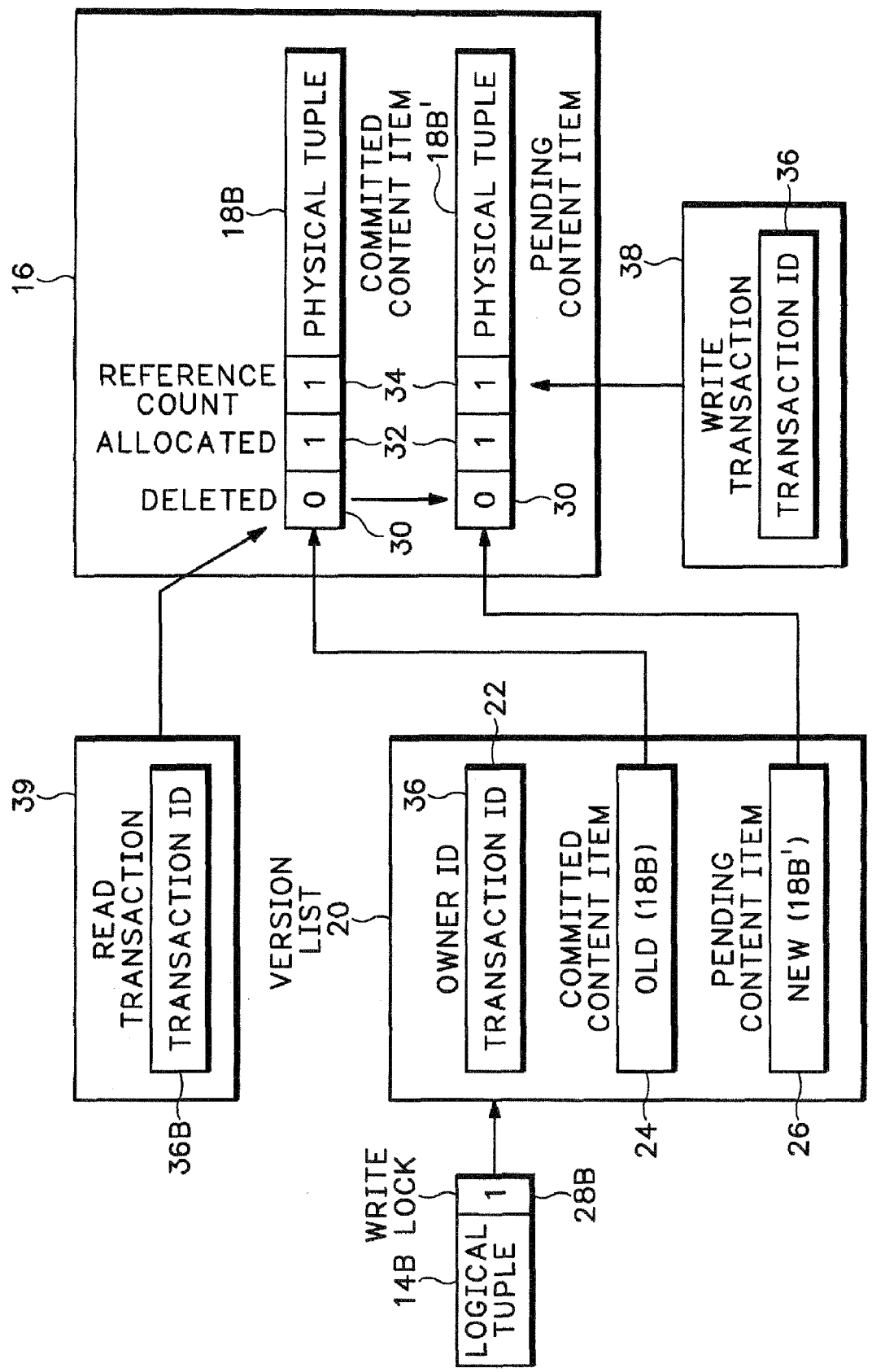

FIG. 4 shows what happens when an update operation 38 is performed on an existing logical tuple 14B. After creating pending content item 18B', but before completing the transaction, the write operation 38 may need to re-access logical tuple 14B. The logical tuple 14B points to version-list 20. Because the transaction Id 36 in owner Id field 22 matches the transaction Id 36 for the write operation 38, this operation uses the pending content item field 26 in version-list 20 to reach the pending content item 18B'. Thus, the write operation 38 only sees the pending content item 18B'. All successive updates made by the write transaction are applied to the pending content item 18B'. These update operations 38 change the version-list 20 if it already exists (e.g. from a previous insert operation) or creates a new one if one does not exist. In this version-list, the committed content item field 24 points to the committed content item 18B and the pending content item field 26 points to the pending content item 18B'. The owner Id field 22 in version-list 20 contains the transaction Id (XID) 36 for write transaction 38.

Any write operation 38 first obtains an exclusive lock on the logical tuple (data record) 14B by requesting an X-lock on the corresponding logical tuple, such as X-lock 302B (FIG. 2). This allows only one write transaction to write to a logical tuple at a given time. However, any read operation, such as read operation 39 part of another Transaction Id 36B, is free to read the committed content item 18B (if one exists) while the X-lock 302B is set. This conforms to an American National Standards Institute (ANSI) READ COMMITTED isolation level. Read committed isolation means that any read operation should read the last committed copy of a data record (logical tuple).

At commit time for those transactions that performed a delete or update operation, the old committed content item needs to be removed from the physical table space. However, the behavior of these write operations 38 is modified based on the reference count 34 associated with the committed content item 18B. The reference count 34 for committed content item 18B is incremented for each read operation 39 accessing the corresponding logical tuple 14B. When the transaction that performed the write operation 38 commits and completes the needed modifications of the logical tuple 14B, it will deallocate the version-list 20 and de-allocate the associated old committed physical content item 18B.

Content items 18 are always created first, and then deleted. The update and delete operations on a logical tuple always delete the prior committed content item. When the transaction that performed the write operation 38 is complete, it will try to delete the old committed content item 18B and will make the pending content item 18B' the new committed content item in the physical table 16.

The write transaction 38 first checks the reference count 34 for the old committed content item 18B. If the reference count 34 is zero, the write transaction 38 assumes full control of the old committed content item 18B and deletes it by resetting the allocated flag 32. If reference count 34 is not zero, the write transaction 38 marks the content item 18B deleted by setting the deleted flag 30 and pushing all necessary log records 45. When the read operation 39 currently reading content item 18B is complete, it decrements the reference count 34. If the reference count 34 is zero, the read operation 39 checks to see if the deleted flag 30 for content item 18B is set. If the deleted flag 30 is set, the read operation 39 effectively removes the content item 18B from the physical table space 16 by resetting the allocated flag 32. The old committed content item 18B is now available to the DBMS 6 for allocating to another content item.

In the "deferred delete" scheme described above, the read operation 39 assumes ownership of the content item 18B and completes the delete without having to push any log record. Additional strategies work in conjunction with deferred delete to make recovery and undo operations possible. A checkpointer assumes that the delete of the content item has actually finished and the copy of the database on disk will always show this content item as marked "deleted" and "free". The recovery process also makes sure that all content items that are not busy are marked free.

The term "tuple lifetime" describes the time required for a physical tuple (content item) to exist for a referencing transaction. For a read-committed isolation read operation, the tuple lifetime for a referenced tuple is the time required to copy the tuple out into the application buffers. For any write operation, including a read-committed isolation write-operation, the lifetime for modified tuples is the lifetime of the modifying transaction. For instance, an X-lock is held on the logical tuple for the lifetime of the tuple and while the pending content item is alive and cannot be modified by any other transaction until the end of the transaction. In a simple locking based concurrency control scheme a shared lock is held on a tuple item, so that there is a guarantee of the existence of the tuple until the reading transaction finishes copying the tuple value into its buffers. One effect of the current scheme is that no locks have to be held by any read-only transactions.

Sorts

A "sort" is a representative of a set of operations that may need to read the same data more than once. Examples of sorts are joins, group by and distinct attribute, etc. A read operation doing a sort may read a set of content items from the physical table. The read operation gains ownership of any content item that may be deleted during the execution of the sort operation and deletes all such content items on the completion of the sort operation.

The deferred delete is extended to statements that need statement level consistency. The sort operation, for example, needs statement level consistency to ensure that the sort actually terminates. In cases where the content item accessed by the sort can change when the sort is underway, there are no termination guarantees. Our scheme guarantees that any content item whose reference count is greater than zero will not be deleted from the table space. Any transaction that needs statement level consistency can increment the reference count of all accessed content items. At the end of the statement, the reference counts for all the content items are decremented.

Figure 5:
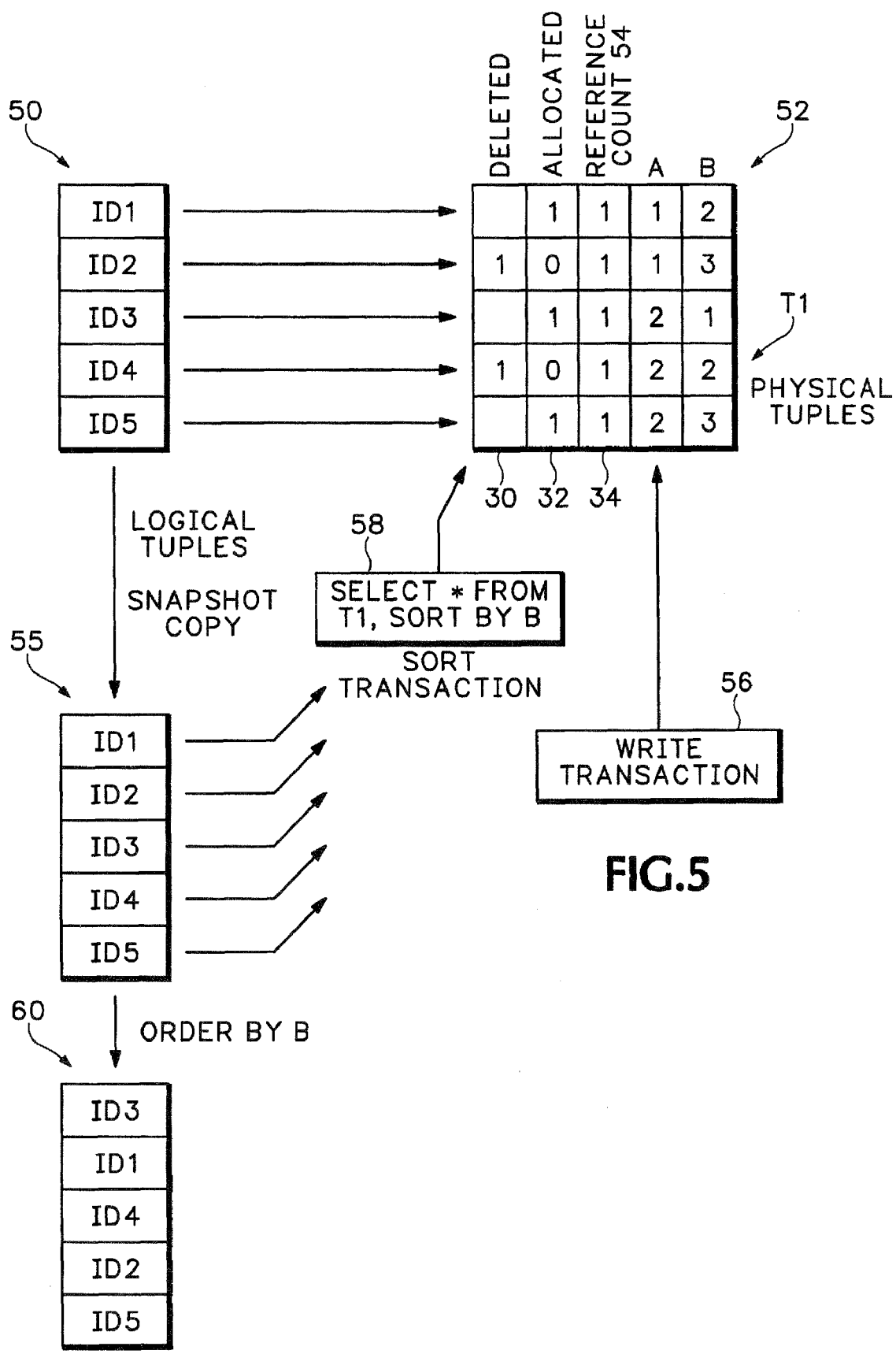
FIG. 5 shows how the version control system operates during a sort operation.

FIG. 5 shows a set of logical tuples 50 that contain address values ID1-ID5. The address values in logical tuples 50 point to corresponding physical tuples 52 in the physical table space T1. In this example, each physical tuple 52 has an "A" column of data records and a "B" column of data records.

One example of a sort operation 58 is the following: (select * from T1 and order by B). In sort operation 58 all physical tuples 52 in table T1 are to be reordered according to the values in column B. Sort operations performed in some other database systems may either have to copy the required physical tuples 52 from table T1 into another temporary table, if they want to maintain high concurrency. The copies of physical tuples in that temporary table are sorted by the operation before using them. This scheme requires a large amount of memory for storing a second set of tuples. Further, the second copy of the tuples 52 cannot be shared with other transactions. Alternatively transactions may have to hold locks for the entire duration of the sort thus severely limiting concurrency in the system. The ORACLE® database system solves this problem with multiple versions but does not maintain a fast access path for previous version thus severely limiting execution speed of the database system.

However, in the present database system, instead of making a second copy of the physical tuples 52, a second copy 55 of the logical tuples 50 is created. The second copy of logical tuples 55 only contains addresses ID1-ID5 and is typically much smaller in size than the physical tuples 52. The sort operation 58 only reads the physical tuples 52. Therefore other transactions, can access the same physical tuples 52.

The reference count 34 is incremented for all of the physical tuples 52 referenced by the sort operation 58. In this case, every physical tuple 52 in the physical table space T1. This insures that the physical tuples 52 are not deleted until the sort transaction 58 is complete. If a write transaction 56 changes the content for any of the physical tuples 52, the deferred delete scheme described above allows the sort operation 58 to control when the old committed physical tuples 52 are deallocated.

During the sort operation 58, the logical tuples 55 are sorted according to the values in data column B of physical tuples 52. The final sorted set of logical tuples is shown in table 60. The deleted flag 30 is set for any of the physical tuples 52 deleted by the write transaction 56. The sort operation 58 resets the allocated flag 32 for the physical tuples 52 with deleted flags 30 set. The sort operation 58 does not reset the allocated flags 32 for the physical tuples 52 that were not flagged as deleted by the write transaction 56.

Indexing

Figure 6:
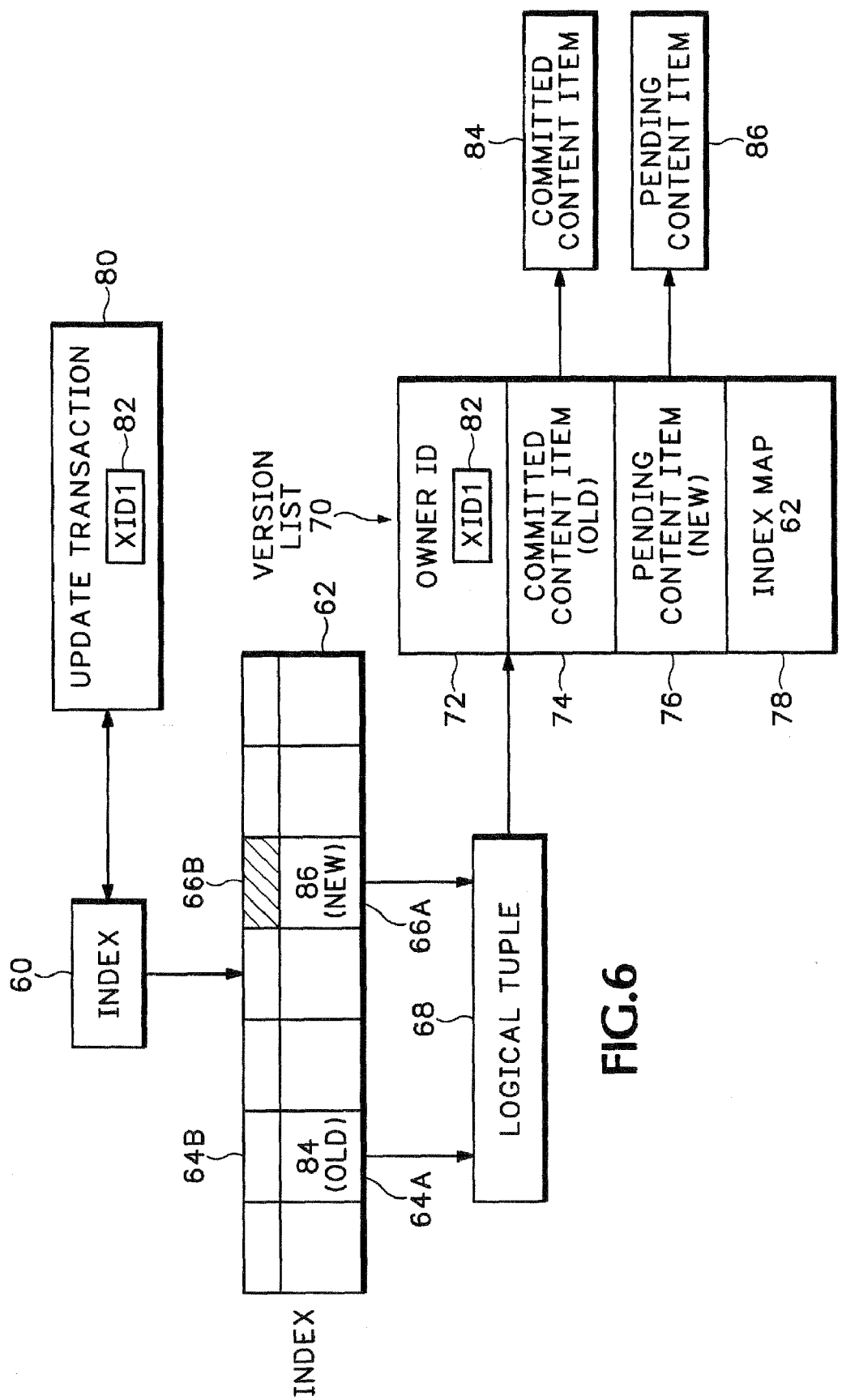
FIGS. 6 and 7 show how indexing is controlled in the database system.

FIG. 6 shows another feature of the version control system where an index scan distinguishes between committed and uncommitted entries in an index 60. Index schemes usually require two or more index lookups for delete operations and multiple index lookups for update and insert operations. The version control system, described above, requires only one index lookup for insert and delete operations, and three index lookups for update operations. Existing optimization techniques can be used to further reduce the cost of lookups for update operations.

To accomplish this efficiency, a version-list 70 stores, in addition to the aforementioned three components, a list of multiple index entries. Each affected index has duplicate index entries. The list of affected indexes is not kept for logical tuple insert and delete operations since these operations affect all indexes. For example, a logical tuple insert requires an insert operation on all indexes on the underlying table. That is, one index lookup operation per logical tuple insert per index. When a transaction (that performed the delete operation on a data record) commits all index entries for that the corresponding logical tuple must be deleted from all indexes. This results in one index lookup operation per logical tuple delete per index.

However, each update operation keeps a list of affected indexes in the corresponding version-list. At the time a logical tuple is updated, a new entry with an uncommitted mark is inserted into all affected indexes. At the time the logical tuple update is committed, the committed index entries for all affected indexes for the logical tuple are deleted and all uncommitted entries are marked committed.

In one example, an insert operation creates logical tuple 68 in turn creating content item 84, version-list 70 and an index entry 64A. The index entry 64A points to logical tuple 68. Initially the pending content item field 74 in version-list 70 points to the committed content item 84 and the committed content item field 76 is null.

In an update operation 80, the index entry 64A and logical tuple 68 already exist. The update transaction 80 creates pending physical content item 86 from the committed content item 84. A version-list 70 is created where the committed content item field 74 points to the committed content item 84 and the pending content item field 76 points to the pending content item 86.

The update operation 80 causes the creation of a new index entry 66A that corresponds to the pending content item 86. The new index entry 66A is marked by setting flag 66B. A marked index entry refers to the new pending version of the content item and an unmarked entry refers to the committed version of the content item. The index is marked as affected meaning there are double entries in the index 62. The version-list 70 also includes an index map 78 that identifies indexes with double entries. In this case, index map 78 identifies index 62 as having double entries 64A and 66A.

During an index scan, the transaction that performed the update operation 80 may receive index entry 64A. Index entry 64A points via logical tuple 68 to the version-list 70. This transaction has the same XID contained in the owner Id field 72 of version-list 70 and the index 62 is identified in index map 78. Therefore, a null value is returned to the transaction preventing the transaction from using the index entry 64A associated with committed content item 84.

The index scan accordingly skips index entry 64A and provides the transaction with marked index entry 66A. The marked index entry 66A points to the version-list 70 via logical tuple 68. Since the index entry 66A is marked and the transaction Id matches the Id in owner Id field 72, the read operation (also called a scan) of the transaction is provided the value in pending content item field 76 that points to pending content item 86. This process ensures that the update transaction uses the correct index entry 66A for accessing pending content item 86.

Figure 7:
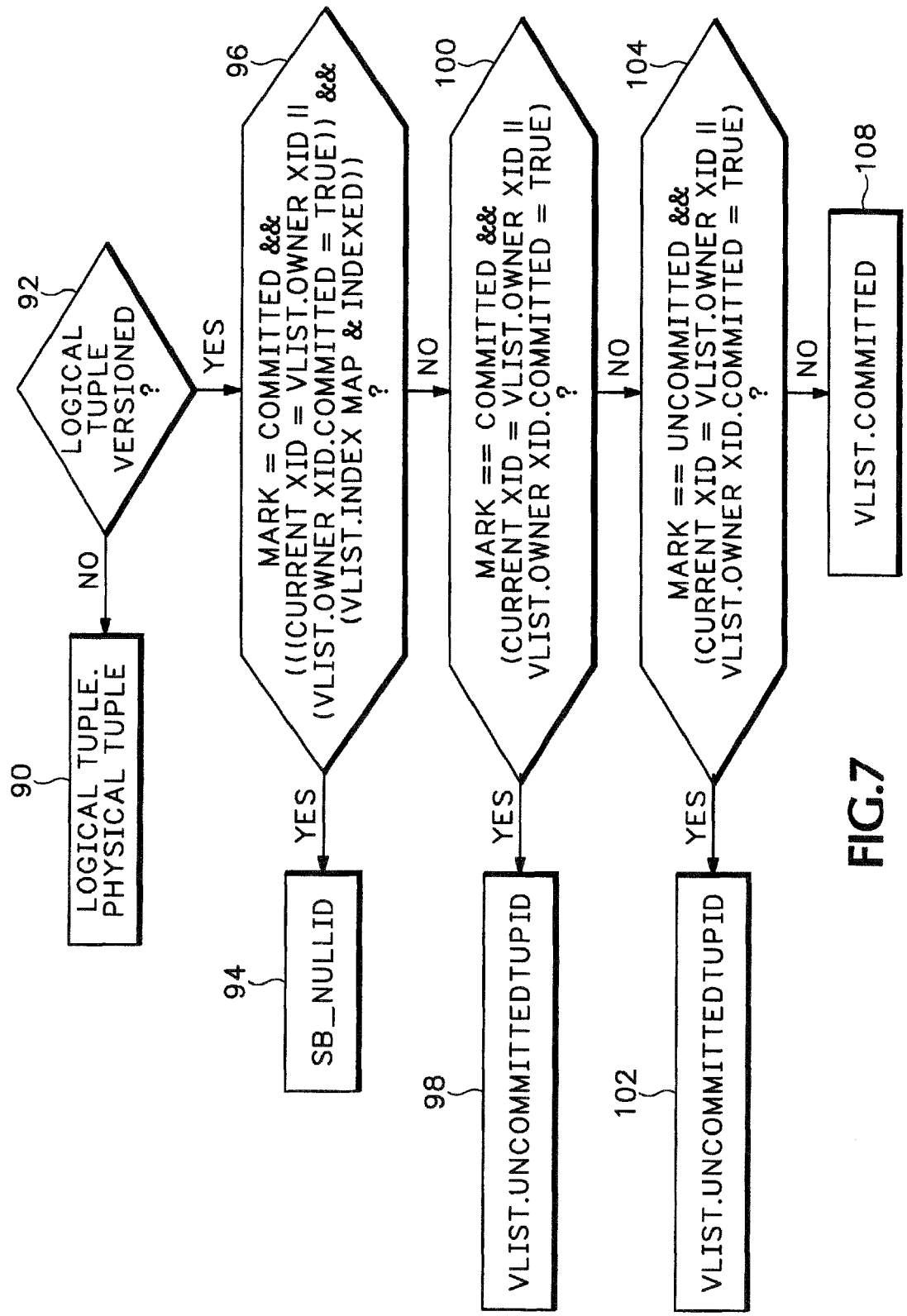

FIG. 7 is a flow diagram describing in more detail the indexing scheme described above. The version-list 70 shown in FIG. 6 is referenced by the owner XID containing the transaction Id of the operation that updated the logical tuple 68. The committed TupId term refers to the physical tuple Id of the previous version of the logical tuple. The uncommitted TupId term refers to the physical tuple Id for the new version of the logical tuple. The indexMap term refers to the bitmap of all effected indexes and in one embodiment is populated only for update transactions. The scanner however analyzes inserts, deletes, affected indexes and unaffected indexes.

The version-list references a logicalTuple.vList. The term "mark" identifies a committed or uncommitted mark in the index entry. The indexId is a bitmap that represents the index entry being scanned. For insert there will be only one index entry which is marked committed.

In block 92 the DBMS determines if the logical tuple is versioned. Non-versioned logical tuples are not analyzed further, and the physical tuple that the logical tuple points to is returned to the scanner in block 90. If the logical tuple is versioned, the logical tuple points to the version-list. When a scanner sees an index entry, it is resolved in the following manner. There are two index entries if the index is an affected index. A first index entry is left unmarked for the committed representing the position where the previous version of the logical tuple is positioned in the index. A second index entry is marked for the uncommitted copy representing the new position of the logical tuple in the index.

In block 96 if the index entry is marked committed; and the transaction Id matches the ownerId in the version-list or the transaction Id represents a committed transaction; and the index entry represents the affected index, which is confirmed by checking the membership of the index Id in the affected index bitmap, a NULLID is returned to the scanner in block 94 and a physical content item entry is assumed not to exist.

If the index entry is marked as committed in block 100 or marked as uncommitted in block 104, and the transaction Id (XID) matches the vlist or if the XID represents a committed transaction, the uncommitedTupleId is returned in block 98 or block 102. If there is no XID match between the transaction and the version-list or the owner XID is not a committed transaction, the commitedTupleId is returned in block 108. The same is true for deletes and the same logic is true for unaffected indexes.

The logic in FIG. 7 is alternately represented as follows:

```
If (logical tuple is not versioned)
    Return logicalTuple.physicalTuple
if ( mark == committed &&
    ( ( (current xid = vlist.ownerXID) ||
        (vlist.ownerXID.committed = TRUE)) &&
        (vlist.indexMap & indexed) ))
    return SB_NULLID;
else if ( mark == committed &&
        ( current xid = vlist.ownerXId ||
            vlist.ownerXID.committed = TRUE))
    return vlist.uncommittedTupId;
else if ( mark == uncommitted &&
        ( current xid = vlist.ownerXId ||
            vlist.ownerXID.committed = TRUE))
    return vlist.uncommittedTupId;
else
    return vlist.committed;
```

The scheme presented above conforms to the standards of ANSI SQL where only an update transaction sees its own updates and read transactions see only committed data. This implementation conforms to ANSI READ COMMITTED isolation levels.

All effects of an update transaction become visible to read transactions in one step. As shown in FIG. 7, all transactions have a committed field, which is set to TRUE when the commit decision is executed for that transaction. After the committed field is set, all scanners see the update value of the logical tuple, by following the uncommitted physical tuple id. Once a decision to commit has been executed, an atomic commit is achieved without holding a latch or a lock. Cleanup of the logical tuples can then be lazy.

The scheme mentioned here is easily portable to serializable transactions where the serializable transactions follow the two-phase locking scheme. To ensure index consistency, a shared lock can be used on any entry that is encountered by a serializable index scan. A read lock can be obtained on the logical tuple pointed to by the index entry. Once the lock is obtained, and the index entry is found to be "in-update", the transaction must be modifying the logical tuple. In this case, the pending content item Id is returned. If it is found that the index entry is not marked, the index entry is ignored if the OwnerId of the logical tuple and the transaction id of the current transaction match, otherwise the committed content item id is returned.

SUMMARY

Different aspects of the invention provide non-blocking reads on behalf of non serializable transactions, that is, a read of a data record is not delayed. Dependency is not needed between reads and writes of a data record and writers are allowed to have dependencies among themselves but are not required with any read operation. Efficient version-location is provided when a read operation reads a data record. There are no delayed consistency checks so a transaction never needs to be rolled back at commit time due to anything other then "write" operation deadlocks that it must have encountered during the execution of the write operations rather than at commit time. Garbage free execution is provided where versions of a data record do not stay in the database any longer than is required. Efficient reduced isolation support provides execution of a transaction running at reduced levels of isolation, including efficient location of a version to be read.

Non-blocking transaction admission does not delay a transaction due to any locking conflicts and the age of data is bounded. Efficient index management is provided in the presence of multiple copies of the same data record and simple extensibility is provided for snapshots while maintaining garbage-less execution properties. Further, transactions do not have to pre-declare themselves to be read-only or read-write.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method for processing data, comprising:
creating, for a first transaction, a pending content item from a committed content item;
providing a second transaction read access to the committed content item while providing the first transaction write access to the pending content item;
the first transaction committing the pending content item;
in response to the first transaction committing the pending content item, flagging the committed content item as deleted; and
deferring deletion of the committed content item until the second transaction finishes accessing the committed content item;
after the second transaction finishes accessing the committed content item, deleting the committed content item;
wherein the method is performed by one or more computing devices.

2. The method of claim 1, further comprising:
incrementing a reference count each time a read transaction accesses the committed content item;
decrementing the reference count each time a read transaction finishes accessing the committed content item; and
initiating deletion of the committed content item by the read transaction that decrements the reference count to zero.

3. The method of claim 2, further comprising:
flagging the committed content item for deletion when the first transaction commits the pending content item;
checking the committed content item for flagged deletion when a completed read transaction reduces the reference count to zero; and
deleting the committed content item by the read transaction only when the committed content item has been flagged for deletion and has a zero reference count.

4. The method of claim 1, further comprising:
creating a version-list having a first field pointing to the committed content item and a second field pointing to the pending content item and a third field storing a transaction Id for the first transaction;
supplying the second field in the version-list to transactions matching the transaction Id in the third field of the version-list and providing the first field to transactions not matching the transaction Id in the third field of the version-list.

5. The method of claim 4, further comprising:
generating a logical tuple;
using the logical tuple to point directly to the committed content item when no write transaction is accessing the committed content item; and
using the logical tuple to point to the version-list when a write transaction is accessing the committed content item.

6. The method of claim 4, further comprising:
marking index entries in an index as committed or uncommitted;
providing an index map in the version-list that identifies indexes having committed and associated uncommitted dual entries;
scanning the index for index entries; and
returning a null value according to the index entry marking and the index contained in the index map.

7. The method claim 6, further comprising returning a pointer to the pending content item when the index entry is not associated with the index map and an identifier (Id) for a transaction initiating the index scan matches the transaction Id in the third field of the version-list.

8. The method of claim 7, further comprising returning a pointer to the committed content item when the index entry is not associated with the index map and an identifier (Id) for the transaction initiating the index scan does not match the transaction Id in the third field of the version-list.

9. The method of claim 2, further comprising:
providing logical tuples;
copying a set of the logical tuples identified in a operation requiring "snapshot" of data;
incrementing a reference count for the physical content items associated with the copied set of logical tuples;
decrementing the reference count for the physical content items when that operation is completed; and
deleting any of the physical content items that have a delete flag and have a zero reference count.

10. A storage device storing instructions which, when executed by one or more processors, cause:
creating, for a first transaction, a pending content item from a committed content item;
providing a second transaction read access to the committed content item while providing the first transaction write access to the pending content item;
committing, by the first transaction, the pending content item;
in response to committing the pending content item, flagging the committed content item as deleted; and
deferring deletion of the committed content item until the second transaction finishes accessing the committed content item;
after the second transaction finishes accessing the committed content item, deleting the committed content item.

11. The storage device of claim 10, instructions when executed by the one or more processors, further cause:
incrementing a reference count each time a read transaction accesses the committed content item;
decrementing the reference count each time a read transaction finishes accessing the committed content item; and
initiating deletion of the committed content item by the read transaction that decrements the reference count to zero.

12. The storage device of claim 11, wherein the instructions when executed by the one or more processors, further cause:
flagging the committed content item for deletion when the first transaction commits the pending content item;
checking the committed content item for flagged deletion when a completed read transaction reduces the reference count to zero; and
deleting the committed content item by the read transaction only when the committed content item has been flagged for deletion and has a zero reference count.

13. The storage device of claim 10, wherein the instructions when executed by the one or more processors, further cause:
creating a set of logical tuples that contain address values pointing to corresponding physical tuples in a table, the table containing a first set of data records identifying a current state for the set of physical tuples and a second set of data records identifying a desired state for the set of physical tuples;
creating a copy of the logical tuples; and
performing an operation on the copy of the logical tuples according to the second set of data records.

14. The storage device of claim 13, wherein the instructions when executed by the one or more processors, further cause:
incrementing a reference count for at least some of the physical tuples referenced by the operation, the incremented reference count preventing the referenced physical tuples from being deleted by other operations; and
enabling the other operations to assign deferred deletes to selected ones of the referenced physical tuples.

15. The storage device of claim 14, wherein the instructions when executed by the one or more processors, further cause:
decrementing the reference count for at least some of the physical tuples after the operation has completed; and
using the operation to delete any of the previously referenced physical tuples that have assigned deferred deletes and a zero reference count.

16. The storage device of claim 10, wherein the instructions when executed by the one or more processors, further cause:
creating a version-list having a first field pointing to the committed content item and a second field pointing to the pending content item and a third field storing a transaction Id for the first transaction;
supplying the second field in the version-list to transactions matching the transaction Id in the third field of the version-list and providing the first field to transactions not matching the transaction Id in the third field of the version-list.

17. The storage device of claim 16, wherein the instructions when executed by the one or more processors, further cause:
generating a logical tuple;
using the logical tuple to point directly to the committed content item when no write transaction is accessing the committed content item; and
using the logical tuple to point to the version-list when a write transaction is accessing the committed content item.

18. The storage device of claim 16, wherein the instructions when executed by the one or more processors, further cause:
marking index entries in an index as committed or uncommitted;
providing an index map in the version-list that identifies indexes having committed and associated uncommitted dual entries;
scanning the index for index entries; and
returning a null value according to the index entry marking and the index contained in the index map.

19. The storage device claim 18, wherein the instructions when executed by the one or more processors, further cause returning a pointer to the pending content item when the index entry is not associated with the index map and an identifier (Id) for a transaction initiating the index scan matches the transaction Id in the third field of the version-list.

20. The storage device of claim 19, wherein the instructions when executed by the one or more processors, further cause returning a pointer to the committed content item when the index entry is not associated with the index map and an identifier (Id) for the transaction initiating the index scan does not match the transaction Id in the third field of the version-list.

21. The storage device of claim 11, wherein the instructions when executed by the one or more processors, further cause:
providing logical tuples;
copying a set of the logical tuples identified in a operation requiring "snapshot" of data;
incrementing a reference count for the physical content items associated with the copied set of logical tuples;

decrementing the reference count for the physical content items when that operation is completed; and deleting any of the physical content items that have a delete flag and have a zero reference count.

22. An article comprising a device, having stored thereon instructions that, in response to execution by one or more processors, cause:

creating a set of logical tuples that contain address values pointing to corresponding physical tuples that include committed content items, wherein the following fields are maintained for each physical tuple:

a reference count field to track a number of operations referring to said each physical tuple;

a deferred delete field to track said each physical tuple is assigned to a deferred delete; and an allocated field to indicate whether said each physical tuple should be deallocated.

23. The article of claim 22, wherein the stored instructions, in response to execution by the one or more processors, further cause:

performing a first operation that creates a particular logical tuple and the committed content item;

creating a first index entry for the first operation that causes the particular logical tuple to point to the committed content item;

performing a second operation that creates a pending content item from the committed content item;

creating a second index entry for the second operation that causes the logical tuple to point to the pending content item.

24. The article of claim 23, wherein the stored instructions, in response to execution by the one or more processors, further cause creating a version-list having a first committed content item field that points to the committed content item and having a second pending content item field that points to the pending content item, wherein the logical tuple is configured to access the first committed content item field when only the first index entry exists and to access the second pending content item field when both the first and second index entries exist.

25. The article of claim 23, wherein the first operation is an insert operation and the second operation is an update operation.

26. The article of claim 22, wherein the stored instructions, in response to execution by the one or more processors, further cause:

creating a set of logical tuples that contain address values pointing to corresponding physical tuples in a table, the table containing a first set of data records identifying a current state for the set of physical tuples and a second set of data records identifying a desired state for the set of physical tuples;

creating a copy of the logical tuples; and processing the copy of the logical tuples according to the second set of data records.

* * * * *

UNITED STATES PATENT AND TRADEMARK OFFICE
CERTIFICATE OF CORRECTION

| | | |
|---|---|---|
| PATENT NO. | : 8,010,497 B2 | |
| APPLICATION NO. | : 11/757224 | |
| DATED | : August 30, 2011 | |
| INVENTOR(S) | : Verma et al. | |

It is certified that error appears in the above-identified patent and that said Letters Patent is hereby corrected as shown below:

On page 2, on the Title Page Item (56), under "Other Publications", line 9, delete "lnterprocess" and insert -- Interprocess --, therefor.

On page 2, on the Title Page Item (56), under "Other Publications", line 27-28, delete "Massachusettes" and insert -- Massachusetts --, therefor.

On page 2, on the Title Page Item (56), under "Other Publications", line 45, delete "Concurency" and insert -- Concurrency --, therefor.

In column 1, line 8, delete "110/636,361," and insert -- 10/636,361, --, therefor.

In column 7, line 59, delete "operation" and insert -- operation, --, therefor.

In column 11, line 27, delete "then" and insert -- than --, therefor.

In column 12, line 60, in Claim 7, before "claim" insert -- of --.

In column 13, line 30, in Claim 11, before "instructions" insert -- wherein the --, therefor.

In column 14, line 47, in Claim 19, before "claim" insert -- of --.

Signed and Sealed this
Twentieth Day of December, 2011

David J. Kappos
*Director of the United States Patent and Trademark Office*